3,291,620
OPTICAL GLASS
Konstantin Sergeevich Evstropjev, Kirovsky Ave. 25, Apt. 53, and Adolf Kapitonovich Yakhkind, Novoizmailovsky Ave. 32, Korp. 2, Apt. 37, both of Leningrad, U.S.S.R.
No Drawing. Filed Apr. 23, 1963, Ser. No. 276,125
1 Claim. (Cl. 106—47)

This invention relates to the production of optical glass, particularly the kind in which the refractive index considerably exceeds that of ordinary glass. Strictly speaking, it refers to optical glass which does not contain silica, boron trioxide, alumina and alkaline oxides, these components being replaced by others.

It is known that quite a large number of optical instruments require for their manufacturing optical glass with high refractive indices and high values of medium dispersion. These features are ensured by introducing into the glass composition various metal oxides.

The qualitative dependence of certain optical properties of optical glass upon one or another oxide component has before long been established. However, the quantitative proportion of the ingredients necessary to produce the required properties is not subject to evaluation. The empirical formulas for calculations suggested by various authors (Demkina, Huggins and Kuan-Han Sun, Appen, Gillard and Dubrul, etc.) make it possible to evaluate, to a sufficient degree of accuracy, optical constants only for silicate and borosilicate glass containing oxide components long ago learned by the industry of optical glass production. New sorts of optical glass with higher optical properties are, therefore, arrived at by experimental testing, gradually varying the quantity of components introduced into the melt.

The quantity of experimental glass meltings is very extensive. Nonetheless, no one succeeded, up to date, in manufacturing optical glass with a refractive index above 2 (commonly, the respective value amounts to 1.9).

This invention allows to manufacture optical glass with a refractive index considerably exceeding that of the known types of glass with high values of medium dispersion and low coefficients of dispersion. The said glass is specially designed for the manufacturing of optical articles with high refractive indices used in optical instruments, this constituting the aim of this invention.

Among such articles are, for example, dispersion prisms of spectral instruments, or negative components of short-focus achromatic lenses. The invention ensures also utilization of such optical glasses in optical instruments operating in the near infra-red, since these glasses remain transparent in this spectral region. Furthermore, the said glass due to its composition, can be made under industrial conditions and not only on laboratory scales, which is ensured by the reduced crystallizing property intrinsic to this glass. Moreover, this glass due to its composition makes it possible to attain high chemical resistance to the effect of atmospheric humidity and low-acid solutions, considerably exceeding the resistance of heavy lead flints with refractive indices of approx. 2.0.

In view of the abovesaid purpose these optical glasses are composed of several ingredients taken in certain proportions.

It naturally follows that in effecting this invention certain changes may be made in these proportions of the components within the ranges indicated below and without altering the very essence of the invention.

Thus, the invention described here represents a new sort of optical glass transparent in the visible and the near infra-red, and possessing high refractive indices above 2.15, as well as dispersion coefficients within the range 16.5–17.5.

The said optical glass contains the following components:

| | Percent |
|---|---|
| (1) Tellurium dioxide | 55–65 |
| (2) Tungsten oxide | 15–17 |
| (3) Tantalum oxide | Up to 8 |
| (4) Bismuth oxide | Up to 6 |
| (5) Barium oxide | 0–5 |
| (6) Thallium monoxide | 2–5 |
| (7) Lead and titanium oxides, a total not over 5%. | |

The quantity is indicated here in percentage of weight.
The required amount of one or the other component necessary to obtain the desired optical properties of glass have been defined during experimental testing and are confined to the ranges indicated.

As an example we cite here the following brands of optical glass manufactured on the basis of this invention.

COMPOSITION OF GLASS (WEIGHT PERCENTAGE)

| Brand No. | $TeO_2$ | $WO_3$ | $Ta_2O_5$ | $Bi_2O_3$ | BaO | $Tl_2O$ | $TiO_2$ | PbO | $La_2O_3$ |
|---|---|---|---|---|---|---|---|---|---|
| 1 | 61.88 | 16.43 | 7.11 | 5.00 | 4.11 | 2.28 | 0.43 | 1.20 | 1.75 |
| 2 | 59.06 | 16.18 | 7.01 | 4.93 | 2.84 | 2.34 | 1.39 | 1.18 | 5.17 |
| 3 | 56.17 | 15.40 | 6.66 | 4.68 | 2.70 | 5.34 | 1.32 | 2.81 | 4.91 |
| 4 | 60.79 | 16.65 | 7.22 | 5.07 | | 2.30 | 1.43 | 1.21 | 5.32 |
| 5 | 57.63 | 15.83 | 6.84 | 4.81 | | 5.49 | 1.36 | 2.89 | 5.05 |

The optical properties of the enumerated brands of glass here are as follows:

| No. of Brand | Refractive Index | Medium Dispersion | Dispersion Coefficient |
|---|---|---|---|
| 1 | 2.1675 | 0.06764 | 17.3 |
| 2 | 2.1608 | 0.06657 | 17.4 |
| 3 | 2.1620 | 0.06669 | 17.4 |
| 4 | 2.1771 | 0.07063 | 16.7 |
| 5 | 2.1775 | 0.07056 | 16.7 |

As may be seen from the table, the refractive index of all the enumerated brands considerably exceeds the value of 2.15.

For effective realization of this invention it should be kept in mind that the melting of these glasses should be carried on in gold, platinum or quartz crucibles.

In accordance with the above stated we claim:

Optical glasses, transparent in the visible and near infrared regions, possessing refractive indices from 2.15 to 2.18, dispersion coefficients 16.5–17.5, and containing in their composition in weight percentage: tellurium dioxide, 55–65; tungsten oxide, 15–17; tantalum oxide, up to 8; bismuth oxide, 0–5; thallium monoxide, 2–5; lanthanum oxide, up to 5; lead and titanium oxides, in total of not over 5%.

References Cited by the Examiner

UNITED STATES PATENTS 2,763,559   9/1956   Weissenberg et al. ____ 106—47

FOREIGN PATENTS 736,073   8/1955   Great Britain.

TOBIAS E. LEVOW, *Primary Examiner.*

H. McCARTHY, *Assistant Examiner.*